US012223196B1

(12) United States Patent
Derzhavetz et al.

(10) Patent No.: US 12,223,196 B1
(45) Date of Patent: Feb. 11, 2025

(54) PROCESSING METADATA CHANGES USING MULTIPLE AGGREGATION POLICIES

(71) Applicant: Dell Products L.P., Round Rock, TX (US)

(72) Inventors: Jenny Derzhavetz, Raanana (IL); Vladimir Shveidel, Pardes-Hana (IL); Nimrod Shani, Raanana (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/494,196

(22) Filed: Oct. 25, 2023

(51) Int. Cl.
  *G06F 3/06* (2006.01)
(52) U.S. Cl.
  CPC ............ *G06F 3/0647* (2013.01); *G06F 3/061* (2013.01); *G06F 3/0685* (2013.01)
(58) Field of Classification Search
  None
  See application file for complete search history.

(56) References Cited

U.S. PATENT DOCUMENTS

| 11,068,199 B2 | 7/2021 | Shveidel et al. |
| 11,068,299 B1* | 7/2021 | Armangau ............ G06F 3/0688 |
| 2022/0342825 A1 | 10/2022 | Derzhavetz et al. |

OTHER PUBLICATIONS

Dovzhenko, Denis, et al.; "Managing Metadata of Variable Length Using Metadata Pages and Delta Records of Transaction Log," U.S. Appl. No. 18/069,331, filed Dec. 21, 2022.
Derzhavetz, Jenny, et al.; "Bypass Destaging of Decrement Reference Count Operations With Delta Log Based Architecture," U.S. Appl. No. 18/210,355, filed Jun. 15, 2023.
Derzhavetz, Jenny, et al.; "Techniques Using a Variable Size Extension Area With Two Phase Destaging," U.S. Appl. No. 18/141,722, filed May 1, 2023.

* cited by examiner

*Primary Examiner* — Charles J Choi
(74) *Attorney, Agent, or Firm* — BainwoodHuang

(57) ABSTRACT

A technique for managing metadata changes in a storage system provides different aggregation policies for use with different metadata. The technique includes assigning metadata changes to respective aggregation policies and storing the assigned metadata changes in a set of data structures. The technique further includes destaging the metadata changes from the set of data structures separately for the different aggregation policies in accordance with settings specific to those aggregation policies.

20 Claims, 4 Drawing Sheets

PROCESSING METADATA CHANGES USING MULTIPLE AGGREGATION POLICIES

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Some storage systems process write requests and other storage activities by making changes in metadata elements that are used to track user data being written or accessed. Such systems may employ data structures for temporarily holding metadata elements that have recently changed. Changes in metadata elements can be accumulated in the data structures for a period of time, and then aggregated and destaged to backend storage, where they are persistently stored.

SUMMARY

In the above scheme, the amount of time that metadata changes remain in the data structures is determined based on a desired level of aggregation. In general, higher aggregation means fewer writes to backend storage, which can help to reduce wear in flash drives. But higher aggregation comes at the cost of delays in updates to backend storage, which can slow down storage activities that depend on those updates being completed. To address this tradeoff, a storage system may select an aggregation level that strikes a balance between minimizing writes to backend storage and resolving dependencies.

Unfortunately, the above-described arrangement for processing metadata changes applies a one-size-fits-all approach, with all changes subject to the same level of aggregation. This arrangement is particularly inefficient in systems that support storage tiering, where different metadata changes relate to data backed by different storage tiers. In general, data in faster tiers are written and reclaimed more often than data in slower tiers, causing the processing of metadata changes relating to data in faster tiers to be more time-critical than the processing of metadata changes relating to data in slower tiers. Current systems provide no ability to process different metadata differently, however. What is needed, therefore, is a way of tailoring the processing of metadata changes to optimize for different metadata separately.

To address the above need at least in part, an improved technique for managing metadata changes in a storage system provides different aggregation policies for use with different metadata. The technique includes assigning metadata changes to respective aggregation policies and storing the assigned metadata changes in a set of data structures. The technique further includes destaging the metadata changes from the set of data structures separately for the different aggregation policies in accordance with settings specific to those aggregation policies.

Advantageously, the improved technique provides different levels of aggregation for different metadata, processing more urgent changes faster than less urgent changes and promoting efficiency overall. The improved technique is particularly advantageous in systems that support storage tiering, as metadata changes pertaining to data in faster storage tiers can be aggregated less and destaged more quickly than metadata changes pertaining to data in slower storage tiers, thereby ensuring that urgent dependencies are resolved quickly for higher storage tiers but that greater aggregation is realized for slower storage tiers.

Certain embodiments are directed to a method of managing metadata changes in a storage system. The method includes assigning each of a plurality of metadata changes to a respective aggregation policy of a plurality of aggregation policies, storing the assigned metadata changes in a set of in-memory buckets, and, for each of the plurality of aggregation policies, separately destaging the metadata changes assigned to the respective aggregation policy to backend storage in accordance with settings specific to the respective aggregation policy.

Other embodiments are directed to a computerized apparatus constructed and arranged to perform a method of managing metadata changes, such as the method described above. Still other embodiments are directed to a computer program product. The computer program product stores instructions which, when executed on control circuitry of a computerized apparatus, cause the computerized apparatus to perform a method of managing metadata changes in a storage system, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique for managing metadata changes in a storage system provides different aggregation policies for use with different metadata. The technique includes assigning metadata changes to respective aggregation policies and storing the assigned metadata changes in a set of data structures. The technique further includes destaging the metadata changes from the set of data structures separately for the different aggregation policies in accordance with settings specific to those aggregation policies.

Figure 1:
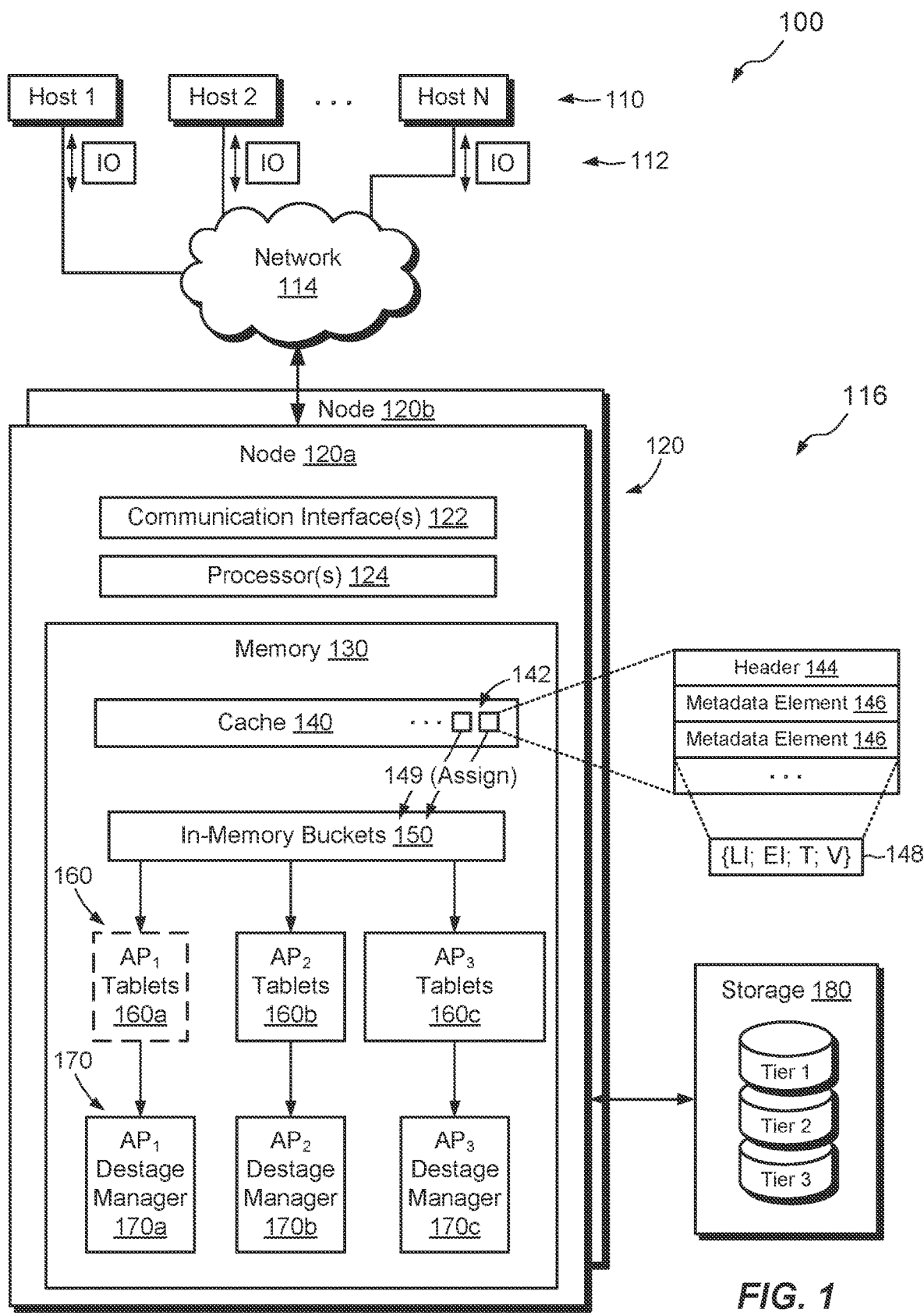
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 116 over a network 114. The data storage system 116 includes one or more nodes 120 (e.g., node 120a and node 120b), and storage 180, such as magnetic disk drives, electronic flash drives, and/or the like. Nodes 120 may be provided as circuit board assemblies, such as blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the node 120 using various technologies, such as Fibre Channel, iSCSI (Internet small computer system interface), NVMeOF (Non-volatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The node 120 is configured to receive I/O requests 112 according to block-based and/or file-based protocols and to respond to such I/O requests 112 by reading or writing the storage 180.

In an example, the storage 180 includes multiple storage tiers, such as Tier 1, Tier 2, and Tier 3. Each storage tier provides a respective level of data-access performance. For example, Tier 1 may be the highest-performance tier, including the fastest disk drives, such as SCM (Storage Class Memory) drives. Tier 2 may be a lower-performance tier, including slower disk drives, such as high-speed flash drives, and Tier 3 may be the lowest performance tier, containing slower flash drives or magnetic disk drives. Although three different storage tiers are shown, the data storage system 116 may include any number of storage tiers, which in some embodiments may consist of only a single tier.

The depiction of node 120a is intended to be representative of all nodes 120. As shown, node 120a includes one or more communication interfaces 122, a set of processors 124, and memory 130. The communication interfaces 122 include, for example, SCSI target adapters and/or network interface adapters for converting electronic and/or optical signals received over the network 114 to electronic form for use by the node 120a. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a cache 140, multiple in-memory buckets 150, multiple sets of persistent tablets 160, and multiple destage managers 170. The cache 140 is configured to hold any number of metadata pages 142 which are being changed, e.g., in response to I/O requests 112 and/or internal data-storage operations. As shown in the depicted example, each metadata page 142 includes a header 144 and multiple metadata elements 146.

The header 144 may indicate the type of metadata page (e.g., mapping pointer array, block virtualization structure, etc.), as well as additional information, such as characteristics of data blocks pointed to or otherwise described by the metadata page 142. These characteristics may include or imply an indicator of a storage tier to which the associated data blocks belong.

In an example, metadata changes 148 in a metadata element 146 are expressed in a compact format, as a four-part tuple {LI; EI; T; and V}, where LI is a logical index (address) of the metadata page 142 in which the changing metadata element 146 is found, EI is an entry index of the changing metadata element 146 within the indicated metadata page 142, T is the type of metadata element, and V is the new value that the metadata element is to assume.

In an example, in-memory buckets 150 are configured to store recent metadata changes 148. The buckets 150 may be arranged at least in part based on LI (logical index) and may be hash based. For example, different buckets 150 are provided for respective hash values. The hash function used to generate the hash values produces many collisions, such that different values of LI typically hash to the same value and are placed in the same bucket.

Persistent tablets 160 are configured to persistently store the contents of the in-memory buckets 150. For example, as the in-memory buckets 150 become full, their contents are transferred to the persistent tablets 160. Multiple transfers may take place over time, with each transfer typically involving an allocation of new tablets 160. The persistent tablets 160 may be backed by one or more flash drives.

Destage managers 170 are configured to aggregate the metadata changes stored in tablets 160 and to write the aggregated changes to backend storage, such as to persistent mapping structures backed by the storage 180. Aggregation may proceed by combining changes in metadata elements 146 having the same LI, i.e., belonging to the same metadata page 142. Writing the aggregated changes to backend storage may entail reading the metadata page 142, modifying the page 142 to include the aggregated changes, and writing the updated page 142 to storage 180.

In accordance with improvements hereof, the storage system 116 supports multiple aggregation policies for respective metadata. Each of the aggregation policies specifies a respective level of aggregation deemed most suitable for the particular metadata involved. For example, changes in metadata elements 146 that support data stored in Tier 1 (the highest-performance tier) may be processed according to a first aggregation policy $AP_1$, which aggregates the least and thus processes metadata updates the fastest. Similarly, changes in metadata elements 146 that support data stored in Tier 2 (the medium-performance tier) may be processed according to a second aggregation policy $AP_2$, which applies an intermediate amount of aggregation, and changes in metadata that support data stored in Tier 3 may be processed with a third aggregation policy $AP_3$, which applies the most aggregation.

To support the different aggregation policies, the persistent tablets 160 may be arranged in multiple groups, e.g., $AP_1$ tablets 160a, $AP_2$ tablets 160b, and $AP_3$ tablets 160c. In an example, each group of persistent tablets is dedicated to a respective aggregation policy and contains only metadata updates that are to be processed according to that policy. Likewise, multiple destage managers 170a, 170b, and 170c may be provided, one for each of the aggregation policies $AP_1$, $AP_2$, and $AP_3$. Each destage manager 170a, 170b, or 170c is configured to perform aggregation and writing for metadata changes to be processed according to the respective aggregation policy only. As shown further below, in-memory buckets 150 themselves may be arranged at least in part based on aggregation policy, e.g., with different buckets or different portions of buckets dedicated to respective aggregation policies.

In some examples, persistent tablets 160 may be omitted for one or more of the aggregation policies. For example, tablets 160a may be omitted for $AP_1$, driving the level of aggregation for $AP_1$ to only the bare minimum supported by the in-memory buckets 150. In cases where tablets 160a are omitted, the $AP_1$ destage manager 170a is configured to aggregate metadata changes from the in-memory buckets 150 directly and to write the aggregated changes to the backend storage 180.

Although in-memory buckets 150 in some embodiments may be assigned to different aggregation policies, all in-memory buckets 150 may be formed in a single region of shared memory space. Thus, there is no need to separate in-memory buckets 150 for different aggregation policies in different memory regions. Similarly, persistent tablets 160 may be allocated from a shared set of storage drives, without the need to provide separate pools or other groups of drives for supporting persistent tablets used for different aggregation policies. In addition, backend structures to which aggregated tablets are destaged may be provided in a single metadata region common to all aggregation policies. In some examples, different backend regions may be provided for different types of metadata (mapping pointers, virtual large blocks, etc.), however.

In example operation, hosts 110 issue I/O requests 112 to the data storage system 116. A node 120 receives the I/O requests 112 at the communication interfaces 122 and initiates further processing. Such processing may entail loading into cache 140 metadata pages 142 that include metadata elements 146 that point to or otherwise reference user data being written consequent to the I/O requests 112. Such metadata elements 146 may be modified in cache 140, and metadata changes 148 may be expressed using the 4-part tuple {LI; EI; T; and V}.

At or around this time, the metadata elements 146 may be assigned 149 to the aggregation policies, e.g., $AP_1$, $AP_2$, or $AP_3$. Assignment may be based on any relevant factors, such as the storage tier (e.g., Tier 1. Tier 2, or Tier 3) on which the user data affected by the metadata change is placed or will be placed. Additionally or alternatively, assignments of aggregation policies may be based on the type T of metadata or on any other factors.

The metadata changes reflecting the updated metadata elements 146 are then written to the in-memory buckets 150, which may be organized by LI as well as by aggregation policy. As the in-memory buckets 150 become full, their contents are transferred to the persistent tablets 160 based on aggregation policy. For example, metadata changes assigned to $AP_1$ are transferred to tablets 160a (if present), metadata changes assigned to $AP_2$ are transferred to tablets 160b, and metadata changes assigned to $AP_3$ are transferred to tablets 160c. We refer to this transfer from buckets 150 to tablets 160 as a "first phase" of destaging.

From here, destage managers 170a, 170b, and 170c may act independently in accordance with their respective aggregation policies, to apply respective levels of aggregation and to write the respective aggregated updates to backend storage 180. For example, each destage manager 170a, 170b, or 170c monitors its own processing debt (e.g., number of tablets being used by the respective aggregation policy) and triggers an aggregation operation once a specified number of tablets is reached. This number of tablets may be referred to herein as a "batch size." We refer to this transfer from tablets 160 to backend storage as a "second phase" of destaging.

Upon continued operation, the in-memory buckets 150 and tablets 160 may be reused. For example, once the contents of in-memory buckets 150 have been transferred to the tablets 160 (or processed directly), those buckets may be cleared such that they are available to receive new metadata changes. Likewise, once a batch of tablets 160 has been aggregated and written to backend storage, the affected tablets can be cleared and reused.

Different amounts of memory may be allocated to in-memory buckets 150 assigned to different aggregation policies. For example, more memory may be allocated to buckets dedicated to aggregation policies that provide greater levels of aggregation. The same approach may apply to persistent tablets 160, with those allocated for aggregation policies providing greater levels of aggregation levels being allocated more space than those providing lesser levels of aggregation.

It should thus be apparent that the disclosed arrangement provides different aggregation policies for different metadata, with each aggregation policy providing a more optimal level of aggregation than would be possible if only a single aggregation policy were used for all of the metadata.

Figure 2A:
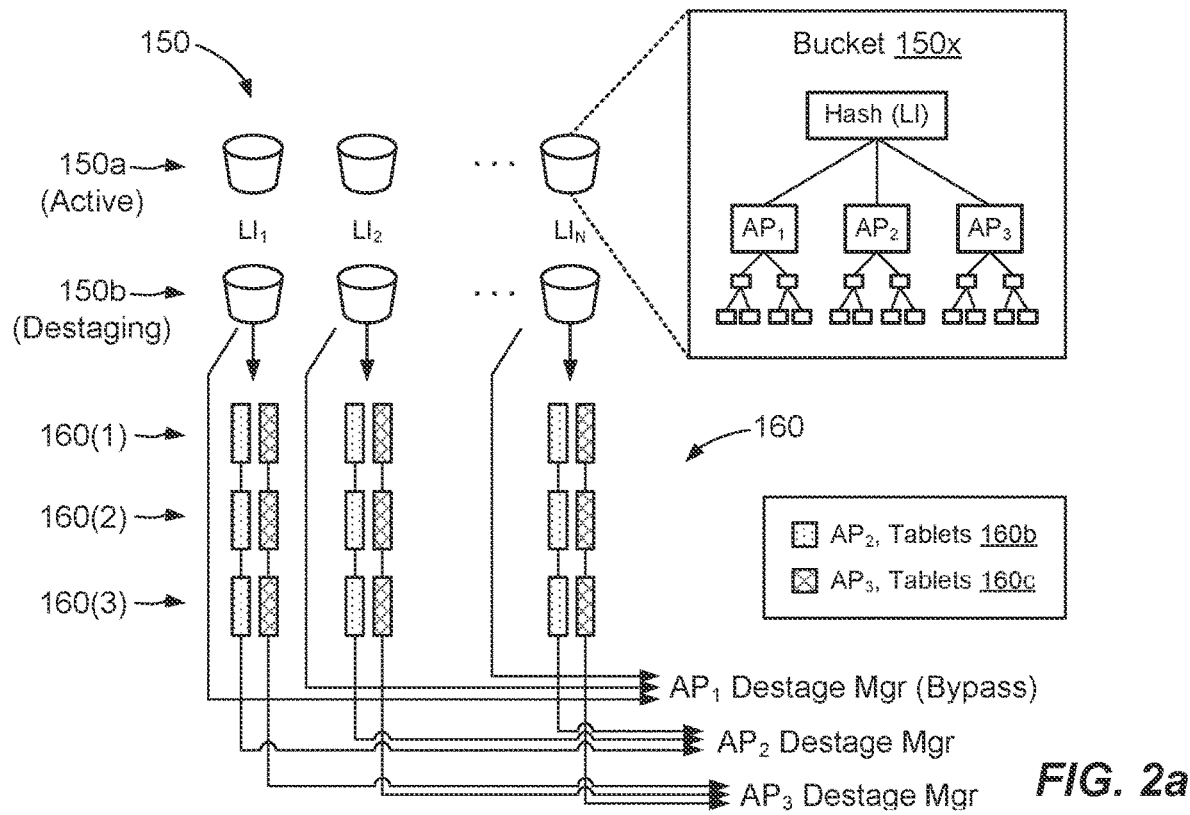
FIGS. 2a and 2b show first and second examples of in-memory buckets and persistent tablets of FIG. 1 in additional detail.
Figure 2B:
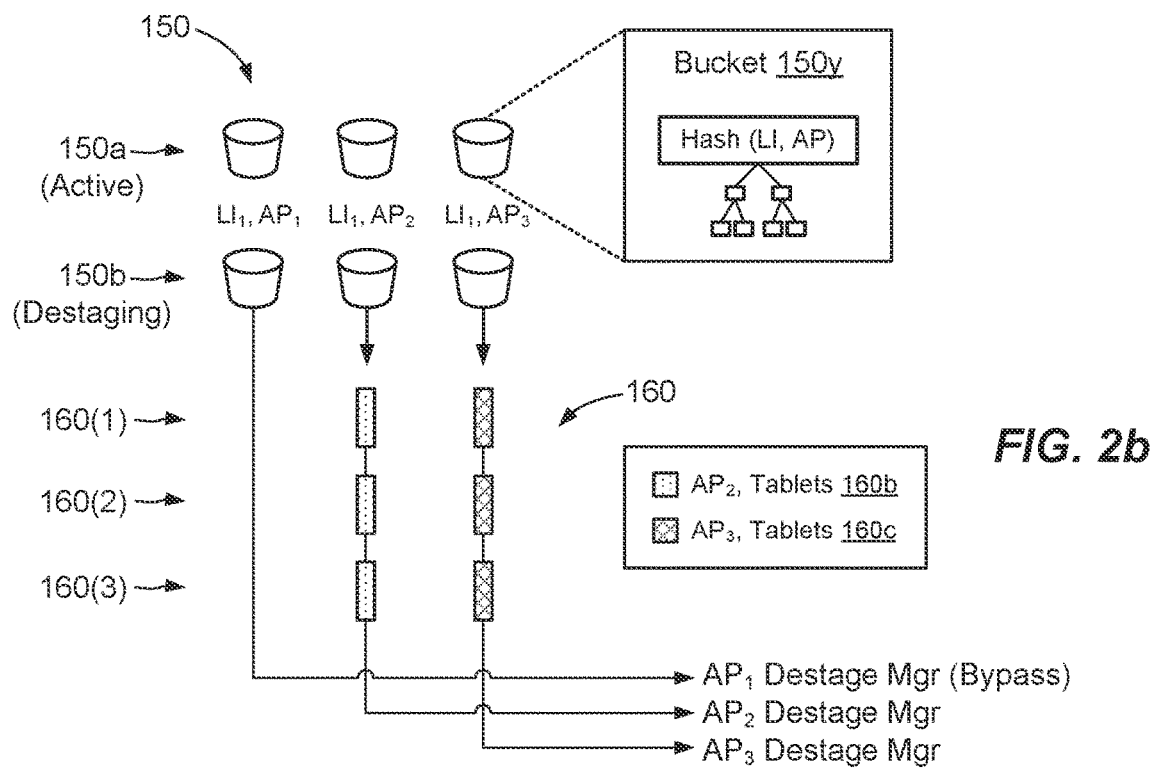

FIGS. 2a and 2b show two examples of how the in-memory buckets 150 may be arranged for efficiently supporting multiple aggregation policies. The examples shown are intended merely for illustration and are not intended to be limiting.

As shown in FIG. 2a, buckets 150 are divided into active buckets 150a and destaging buckets 150b. The active buckets 150a are configured to receive new metadata changes from cache 140 and to organize such metadata changes in an efficient manner. The destaging buckets 150b were previously the active buckets, but they are now frozen and their contents are being transferred to the tablets 160. After the destaging buckets 150b have been transferred and cleared, they become the new active buckets once the current active buckets 150a become full. When the active buckets 150a become full, they are frozen and their status is changed to "destaging." In this manner, one set of active buckets is always maintained, while another set is being destaged and then waits to assume the role of active buckets.

In this example, the buckets 150 are dedicated to respective hash values of LIs (logical indices; e.g., $LI_1$, $LI_2$ . . . , $LI_N$). As shown to the right of the figure, different regions of the buckets 150 are dedicated to respective aggregation policies. For example, each bucket 150x is arranged as a tree. The tree has a root node, Hash (LI), and one direct child node for each aggregation policy, $AP_1$, $AP_2$, and $AP_3$. Below each child node is a respective tree of nodes representing metadata changes of respective metadata elements 146, which metadata changes have been assigned to the respective aggregation policy. Thus, all metadata changes recorded in the tree descending from $AP_1$ have been assigned to $AP_1$, all metadata changes recorded in the tree descending from $AP_2$ have been assigned to $AP_2$, and all metadata changes recorded in the tree descending from $AP_3$ have been assigned to $AP_3$. The depicted arrangement separates metadata changes for the different aggregation policies and facilitates the subsequent transfer of metadata changes to dedicated tablets 160a, 160b, and 160c.

Multiple levels 160(1), 160(2), and 160(3) of tablets 160 are shown, reflecting separate transfers of metadata changes from destaging buckets 150b to tablets 160. When transferring metadata changes from destaging buckets 150b to tablets 160, metadata changes for different aggregation policies (sub-trees of the buckets 150x) are transferred to different groups of tablets. For example, metadata changes assigned to $AP_2$ are transferred to tablets 160b dedicated to $AP_2$ and metadata changes assigned to $AP_3$ are transferred to tablets 160c dedicated to $AP_3$. FIG. 2a shows the different groups of tablets using different shading. For this example, it is assumed that no tablets 160a are provided for $AP_1$, where metadata changes bypass the tablets 160 and instead are processed directly by the destage manager 170a.

FIG. 2b shows another example arrangement, which is similar to the FIG. 2a example in many ways but differs in that the in-memory buckets 150 are identified by both LI (logical index) and AP (aggregation policy). For example, each bucket 150y is identified by a hash of both LI and AP. Such hashing is preferably performed in a way that provides hash collisions for LI but no hash collisions for AP, meaning that each bucket 150y contains metadata changes for numerous LIs but for only a single AP. Transferring metadata changes from destaging buckets 150b to tablets 160 is simplified in this example, as the entire contents of each bucket 150y may be transferred to a respective tablet 160.

In the examples of both FIGS. 2a and 2b, transferring metadata changes from destaging buckets 150b to tablets 160 may involve converting the tree-based structure of buckets 150b to an array-based structure in the tablets 160. In an example, the array-based structure is ordered by LI and sub-ordered by time. Subsequent aggregation may then proceed by applying changes to the respective metadata pages 142 specified by each LI in order of increasing time.

Figure 3:
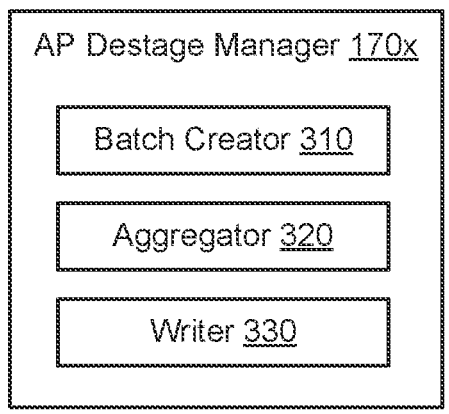
FIG. 3 shows an example destage manager of FIG. 1 in additional detail.

FIG. 3 shows an example destage manager 170x in greater detail. The depicted destage manager 170x is intended to be representative of the destage managers 170a, 170b, and 170c of FIG. 1. As shown, the destage manager 170x includes a batch creator 310, an aggregator 320, and a writer 330.

The batch creator 310 is configured to assemble batches of tablets 160 for aggregation. For example, the batch creator 310 may assemble batches of tablets 160 according to a batch-size setting specific to the respective aggregation policy. For instance, the batch creator 310 for $AP_2$ may assemble smaller batches of tablets than the batch creator 310 for $AP_3$. The batch creator 310 for $AP_1$ may assemble even smaller batches, or zero-size batches for the bypass case, meaning that batches are formed directly from the in-memory buckets 150. The aggregator 320 is configured to aggregate metadata changes on a per-LI basis across the entire batch, producing for example a time-ordered list of changes to be applied to the metadata page 142 identified by the respective LI. The writer 330 is configured to apply each list of changes in time order to the respective metadata page 142 and to write the page back to storage 180.

Figure 4:
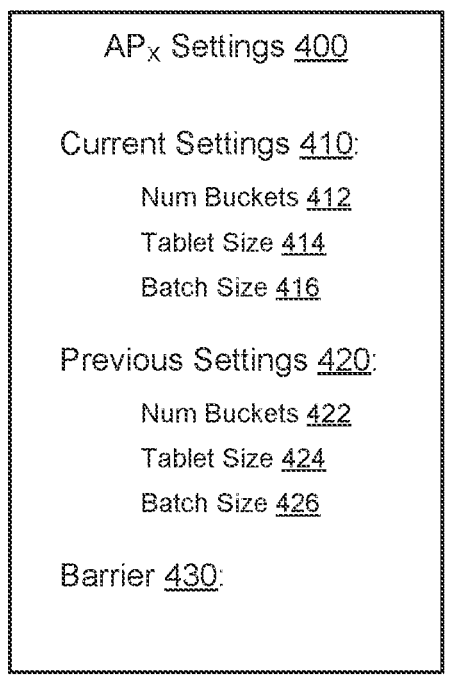
FIG. 4 shows example settings of an aggregation policy in greater detail.

FIG. 4 shows example settings 400 that define an aggregation policy, $AP_X$. The settings 400 are preferably persisted, such that they survive reboots and system errors. For example, settings that pertain to a particular storage tier may be persisted in one or more devices that belong to that storage tier. Settings 400 for an aggregation policy may be dynamically changed. To this end, the settings 400 may include current settings 410, previous settings 420, and a specified barrier 430, which marks a point of transition from the previous settings 410 to the current settings 420, such as a time, a tablet identifier, or another indicator. In an example, an auto-incrementing tablet identifier may be assigned to each bucket 150, and the barrier 430 may be set to the first tablet identifier following the transition.

Current settings 410 may include a number of buckets 412, a tablet size 414, and a batch size 416. Previous settings 420 may likewise include a number of buckets 422, a tablet size 424, and a batch size 426.

The numbers of buckets 412 and 422 represent a number of in-memory buckets 150 to be used for the respective aggregation policy. Assuming the FIG. 2b example, where each bucket 150 is provided for a respective AP, the numbers of buckets 412 and 422 represent the number of buckets 150 allocated in memory for the respective AP.

Tablet sizes 414 and 424 represent the sizes of tablets 160 dedicated to the respective aggregation policy, such as the size of tablets 160a, 160b, or 160c. Setting the tablet size 414 or 424 to zero indicates a bypass arrangement, where no tablets are used and destaging proceeds to backend storage 180 in a single phase.

Batch sizes 416 and 426 specify the numbers of tablets 160 to be aggregated in each batch. Larger values of batch size mean greater aggregation, whereas smaller values mean less. Setting batch size 416 or 426 to zero also indicates the bypass arrangement.

One should appreciate that a variety of additional or alternative settings may be tracked, such as the sizes of in-memory buckets 150, the total amount of persistent storage available for tablets 160 in each aggregation policy, and the like. The depicted settings 400 are merely examples.

The depicted settings 400 allow for adjustments to be made dynamically during runtime. For example, establishing a new batch size 416 for an aggregation policy is readily achieved by informing the respective destage manager 170a, 170b, or 170c of the new setting. In response to receiving the new setting 416, the destage manager begins accumulating the new number of tablets in each batch. Changing the tablet size 414 is more involved than changing the batch size, as destaging activities should be made aware of the new tablet size such that tablets can be located properly. Changing the number of buckets 422 or bucket sizes is the most complex, particularly if the hashing scheme is changed (e.g., from the FIG. 2a arrangement to the FIG. 2b arrangement). In such cases, the second phase of destaging should complete for all debt accumulated using the previous policy setting 422 before the buckets are changed and the new setting 412 is put into place.

Settings 400 may be changed non-disruptively as user patterns change. There is no need to pause I/O processing. Once old settings are changed, new settings take effect either on the next batch or over the ensuing minutes, as the changes made using the old settings propagate through the destaging phases and are replaced with changes made using the new settings.

Settings may also be tuned dynamically, and resulting performance may be monitored. In some examples, a machine-learning approach may be separately applied for optimizing settings for each aggregation policy.

Figure 5:
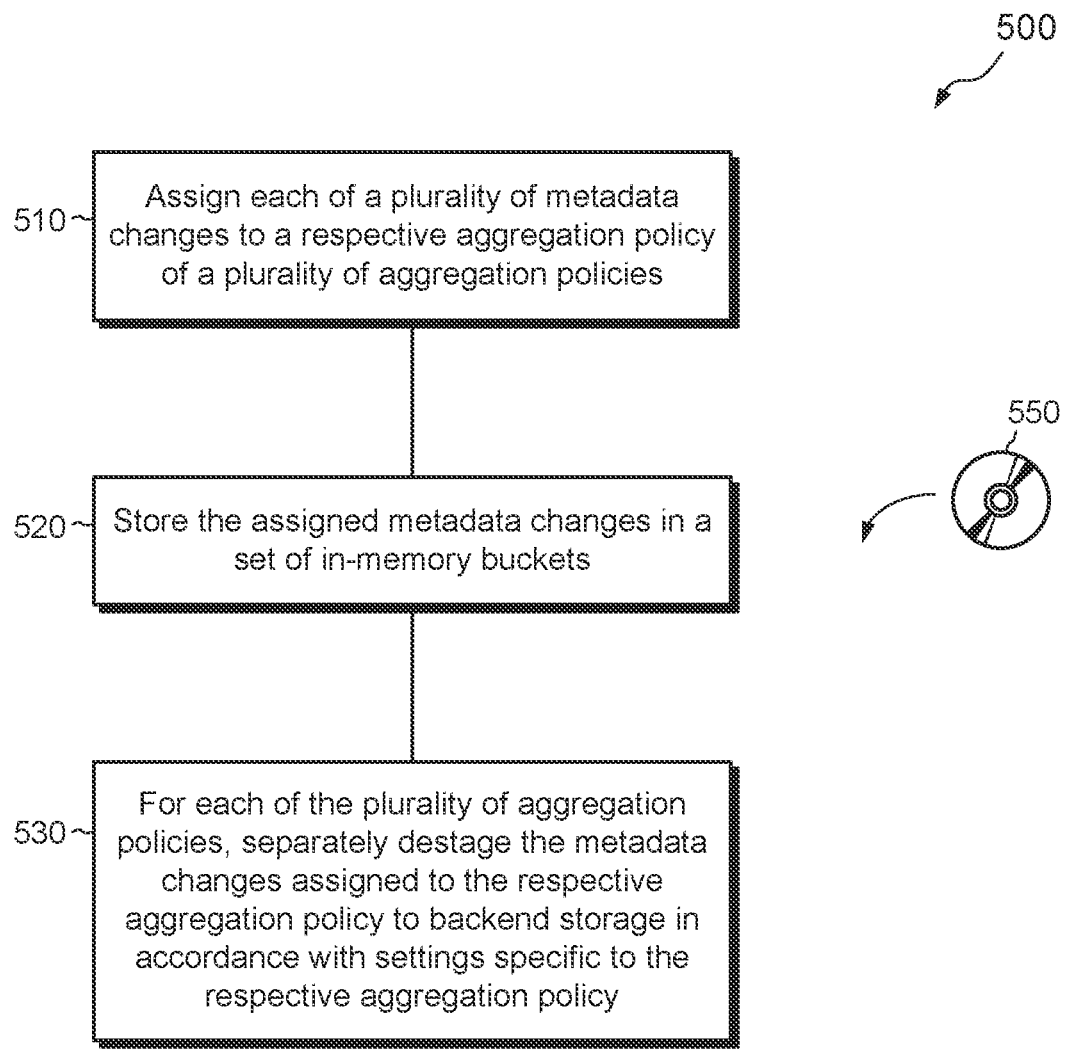
FIG. 5 shows an example method of managing metadata changes in a storage system.

FIG. 5 shows an example method 500 that may be carried out in connection with the environment 100 and provides an overview of some of the features described above. The method 500 is typically performed, for example, by the software constructs described in connection with FIG. 1, which reside in the memory 130 of the node 120a and are run by the set of processors 124. The various acts of method 500 may be ordered in any suitable way. Accordingly, embodiments may be constructed in which acts are performed in orders different from that illustrated, which may include performing some acts simultaneously.

At 510, each of a plurality of metadata changes 148 is assigned to a respective aggregation policy (e.g., $AP_1$, $AP_2$, or $AP_3$) of a plurality of aggregation policies $AP_1$, $AP_2$, and $AP_3$. At 520, the assigned metadata changes 148 are stored in a set of in-memory buckets 150, such as in buckets 150x (FIG. 2a) or in buckets 150y (FIG. 2b). At 530, for each of the plurality of aggregation policies (e.g., $AP_1$, $AP_2$, and $AP_3$), the metadata changes 148 assigned to the respective aggregation policy are separately destaged to backend storage 180 in accordance with settings 400 specific to the respective aggregation policy. Destaging may proceed in two phases for some aggregation policies, and in a single stage (bypass) for others.

An improved technique has been described for managing metadata changes 148 in a storage system 116. The technique provides different aggregation policies (e.g., $AP_1$, $AP_2$. $AP_3$) for use with different metadata, such as different types of metadata or metadata describing user data stored in different storage tiers. The technique includes assigning 149 metadata changes 148 to respective aggregation policies and storing the assigned metadata changes in a set of data structures, such as buckets 150. The technique further includes destaging the metadata changes 148 from the set of data structures 150 separately for the different aggregation policies in accordance with settings 400 specific to those aggregation policies.

Having described certain embodiments, numerous alternative embodiments or variations can be made. For example, although embodiments have been described that assign metadata changes to aggregation policies based on storage tiers in which user data described by the metadata changes are placed, this is merely an example. Alternatively, metadata changes may be assigned to aggregation policies based on other criteria, such as the type of metadata or whether the processing of particular metadata changes are deemed to be urgent.

Also, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 550 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing metadata changes in a storage system, comprising:
   assigning each of a plurality of metadata changes to a respective aggregation policy of a plurality of aggregation policies;
   storing the assigned metadata changes in a set of in-memory buckets; and
   for each of the plurality of aggregation policies, separately destaging the metadata changes assigned to the respective aggregation policy to backend storage in accordance with settings specific to the respective aggregation policy.

2. The method of claim 1, wherein the storage system includes multiple storage tiers for storing user data, and wherein each of the plurality of aggregation policies is provided for metadata changes that relate to user data stored in a respective storage tier.

3. The method of claim 2, wherein separately destaging the metadata changes, for at least a subset of the plurality of aggregation policies, proceeds in two phases:
   a first phase that includes transferring a set of metadata changes assigned to the respective aggregation policy from the set of in-memory buckets to a set of persistent tablets; and
   a second phase that includes (i) aggregating the set of metadata changes with additional sets of metadata changes and (ii) transferring the aggregated metadata changes to the backend storage.

4. The method of claim 3, wherein each of the subset of aggregation policies has an associated set of persistent tablets dedicated to the respective aggregation policy.

5. The method of claim 4, further comprising aggregating fewer sets of persistent tablets for a higher-performance storage tier than are aggregated for a lower-performance storage tier.

6. The method of claim 3, wherein separately destaging the metadata changes for a particular aggregation policy of the plurality of aggregation policies proceeds in a single phase in which assigned metadata changes are placed in the backend storage without first placing them in any persistent tablets.

7. The method of claim 3, wherein each of the plurality of aggregation policies is associated with multiple persistent settings, the persistent settings including a number of buckets of the set of buckets dedicated to the respective aggregation policy.

8. The method of claim 3, wherein each of the subset of aggregation policies is associated with multiple persistent settings, the persistent settings including a size on disk of persistent tablets for the respective aggregation policy.

9. The method of claim 3, wherein each of the plurality of aggregation policies is associated with multiple persistent settings, the persistent settings including a batch size that specifies a number of tablets to be aggregated when performing the second phase of destaging.

10. The method of claim 3, wherein each of the plurality of aggregation policies is associated with multiple persistent settings, and wherein the method further comprises changing the persistent settings associated with at least one of the plurality of aggregation policies nondisruptively while the storage system continues to operate.

11. The method of claim 10, wherein the persistent settings associated with at least one of the plurality of aggregation policies include:
   a set of current settings;
   a set of previous settings; and
   an indicator of a transition point between the set of previous settings and the set of current settings.

12. The method of claim 1, wherein each of the set of in-memory buckets is dedicated to a respective metadata page having a logical index, and wherein storing the assigned metadata changes in the set of in-memory buckets includes:
   locating a target in-memory bucket for a particular assigned metadata change based on a logical index associated with the metadata page to which the particular assigned metadata change belongs; and
   placing the particular assigned metadata change into a region of the target in-memory bucket designated for the aggregation policy assigned to the particular assigned metadata change.

13. The method of claim 1, wherein each of the set of in-memory buckets is dedicated to a respective metadata page having a logical index, and wherein storing the assigned metadata changes in the set of in-memory buckets includes:
   locating a target in-memory bucket for a particular assigned metadata change based on both (i) a logical index associated with the metadata page to which the particular assigned metadata change belongs and (ii) an aggregation policy to which the particular assigned metadata change is assigned; and
   placing the particular assigned metadata change into the target in-memory bucket.

14. A computerized apparatus, comprising control circuitry that includes a set of processors coupled to memory, the control circuitry constructed and arranged to:
   assign each of a plurality of metadata changes to a respective aggregation policy of a plurality of aggregation policies;
   store the assigned metadata changes in a set of in-memory buckets; and
   for each of the plurality of aggregation policies, separately destage the metadata changes assigned to the respective aggregation policy to backend storage in accordance with settings specific to the respective aggregation policy.

15. The computer program product of claim 14, wherein the storage system includes multiple storage tiers for storing user data, and wherein each of the plurality of aggregation policies is provided for metadata changes that relate to user data stored in a respective storage tier.

16. A computer program product including a set of non-transitory, computer-readable media having instructions which, when executed by control circuitry of a computerized apparatus, cause the computerized apparatus to perform a method of managing metadata changes in a storage system, the method comprising:
   assigning each of a plurality of metadata changes to a respective aggregation policy of a plurality of aggregation policies;
   storing the assigned metadata changes in a set of in-memory buckets; and
   for each of the plurality of aggregation policies, separately destaging the metadata changes assigned to the respective aggregation policy to backend storage in accordance with settings specific to the respective aggregation policy.

17. The computer program product of claim 16, wherein the storage system includes multiple storage tiers for storing user data, and wherein each of the plurality of aggregation policies is provided for metadata changes that relate to user data stored in a respective storage tier.

18. The computer program product of claim 17, wherein separately destaging the metadata changes, for at least a subset of the plurality of aggregation policies, proceeds in two phases:
   a first phase that includes transferring a set of metadata changes assigned to the respective aggregation policy from the set of in-memory buckets to a set of persistent tablets; and a second phase that includes (i) aggregating the set of metadata changes with additional sets of metadata changes and (ii) transferring the aggregated metadata changes to the backend storage.

19. The computer program product of claim 18, wherein each of the subset of aggregation policies has an associated set of persistent tablets dedicated to the respective aggregation policy.

20. The m computer program product of claim 19, wherein the method further comprises aggregating fewer sets of persistent tablets for a higher-performance storage tier than are aggregated for a lower-performance storage tier.

\* \* \* \* \*